United States Patent Office 2,914,366
Patented Nov. 24, 1959

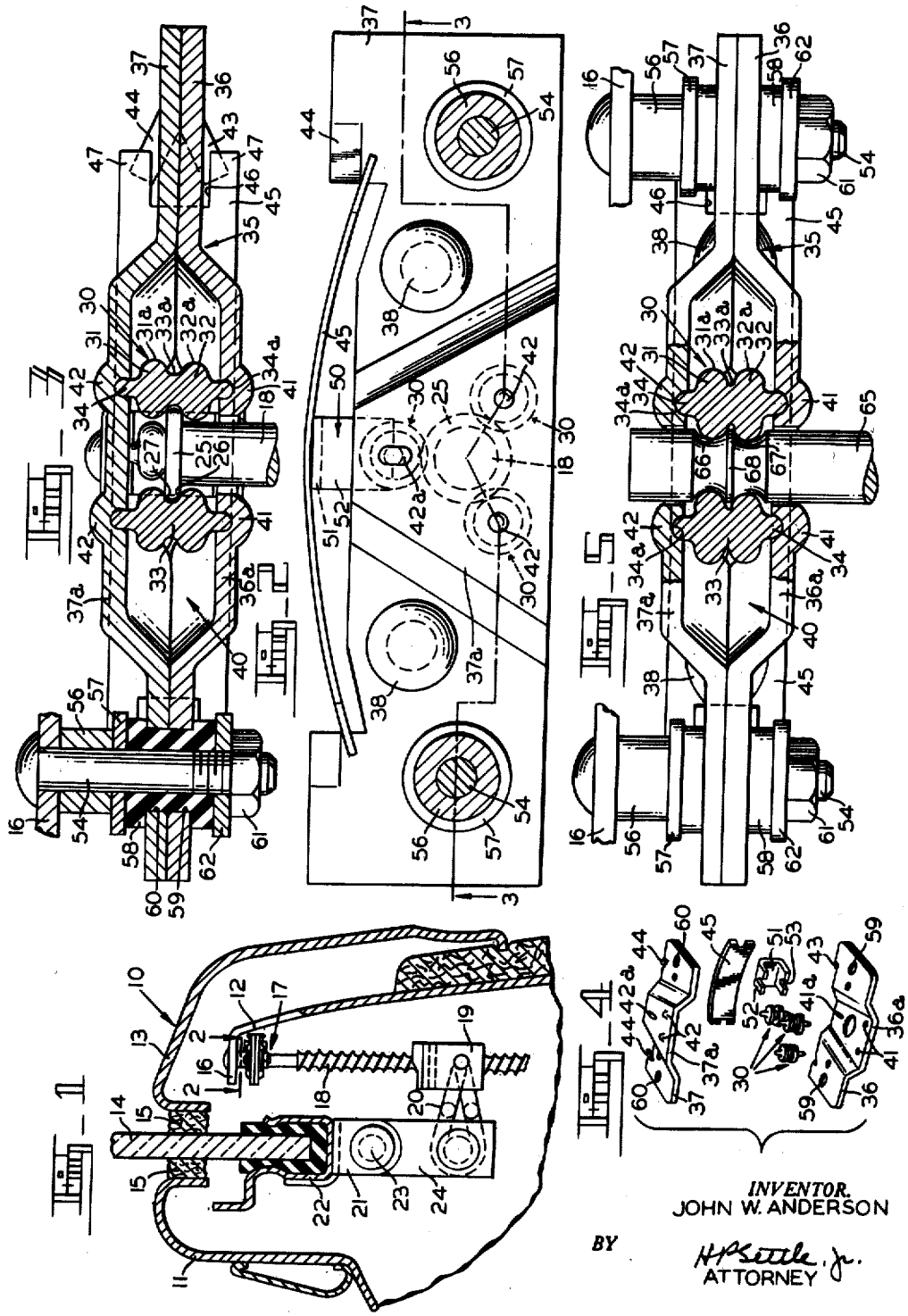

2,914,366
THRUST BEARING
John W. Anderson, Gary, Ind.
Application June 1, 1955, Serial No. 512,464
10 Claims. (Cl. 308—203)

The present invention relates to a thrust bearing, and more particularly to a bearing for supporting a rotatable shaft or the like against axial thrust loads.

The present invention provides an extremely simple and inexpensive thrust bearing for supporting a shaft or the like against axial loads. Generally, the invention proposes the utilization of a plurality of thrust-bearing elements disposed circumferentially about the part to be journalled and supported for rotation about separate independent axes by a carrier which engages the elements.

The elements are provided with one or more toroidal surface portions adapted to abut one or more generally radially directed shoulders on the shaft. The shaft shoulder may be formed by either recessing the shaft, in which event the radial surfaces on the shaft lie within the confines of the shaft, or by providing a radially outwardly extending circumferential projection on the shaft, in which event a radially outwardly extending shoulder is provided. Preferably, the bearing of the present invention is adapted for supporting a shaft or the like against an axial thrust load acting in either axial direction. In this event, two or more toroidal circumferential portions are provided on each of the shaft-engaging elements, adjacent toroidal portions of the element being spaced by a reduced surface portion which is out of contact with the element being journalled, but in close running relation thereto. The shaft shoulders abut the toroidal surface portions of the elements in substantially point-to-point engagement, and the elements are held against axial movement by a carrier substantially surrounding the elements, thus supporting the shaft against axial displacement.

It is, therefore, an important object of the present invention to provide an improved thrust bearing for journalling an element, such as a shaft, against axial displacement while accommodating rotation thereof.

Another important object of the present invention is to provide an improved thrust bearing utilizing a plurality of individual elements having toroidal surface portions which are engageable with generally radially directed portions of the member being journalled to prevent axial displacement thereof.

It is a further important object of the present invention to provide an improved thrust bearing for journalling a shaft or the like provided with a pair of spaced, oppositely directed shoulders, the bearing including a plurality of circumferentially arranged shaft-engaging elements having substantially toroidal surfaces in surface contact with the shoulders to resist axial displacement of the shaft.

Yet another object is the provision of a thrust bearing for rotationally journalling a shaft or the like while preventing axial displacement thereof, the bearing including a plurality of shaft-engaging surface portions of toroidal contour, the elements being rotatable about axes coincident with the axes of generation of the toroidal surface portions, and the toroidal portions engaging substantially radially directed surfaces formed on the shaft to prevent axial displacement thereof.

Still another important object of the present invention is the provision of a thrust bearing particularly adapted for supporting a shaft against axial displacement, the bearing including a resiliently mounted housing and a plurality of individual rotational elements disposed within the housing and each having spaced surface portions engageable with the shaft, one of the elements being resiliently urged against the shaft to compensate for wear of the elements or the shaft during utilization of the bearing, and the resilient mounting of the housing accommodating shifting movement thereof to maintain the elements in proper running relation with the housing despite such wear.

Other and further objects of the present invention will become apparent from a study of the detailed description of the invention hereinafter set forth and the appended drawings.

On the drawings:

Figure 1 is a fragmentary sectional view, with parts shown in elevation, of a vehicular window-lift mechanism provided with a bearing of the present invention;

Figure 2 is a sectional view taken along the plane 2—2 of Figure 1;

Figure 3 is a sectional view, with parts shown in elevation, taken on the planes 3—3 of Figure 2;

Figure 4 is an exploded view of the bearing illustrated in Figures 1–3; and

Figure 5 is a view similar to Figure 3 illustrating a slightly different form of the bearing of the present invention.

As shown on the drawings:

In Figure 1, reference numeral 10 refers generally to a vehicular body component, such as a door having an outer door panel 11 and an inner door panel 12. The inner door panel is provided with a separate upper panel section 13 which cooperates with the outer panel 11 to guide therebetween a vertically movable vehicular window 14.

The window 14 is engaged on opposite sides by weather strips or the like 15 carried by the panels 11 and 13. The inner door panel 12 is provided with an inwardly directed flange 16 which carries a bearing of the present invention, indicated generally at 17, which journals the upper end of a rotatable, exteriorly threaded drive shaft 18. A medial portion of the threaded shaft 18 is encompassed by a nut assembly 19 which is joined by a hanger 20 to the window 14 by means of an upper hanger bracket 21 secured to a supporting channel 22 of the window 14 and pivoted, as at 23 to a lower hanger unit 24 which carries the nut 19 through the element 20. Obviously, upon rotation of the threaded shaft 18, the nut assembly 19 will travel vertically along the shaft to elevate and lower the window 14 to close or open a ventilation opening provided in the body component 10.

The bearing 17 is more particularly illustrated in Figures 2, 3 and 4 of the drawings. Referring particularly to Figure 3 of the drawings, it will be seen that the upper end of the shaft 18 is provided with a radially enlarged terminal protuberance 25 which provides shoulders or the like thereon. These shoulders are indicated at 26 and 27, respectively, and it will be appreciated that these shoulder surfaces 26 and 27 are substantially radially directed.

The shoulders 26 and 27 are engaged by rotatable bearing elements indicated generally at 30 and comprising a pair of generally toroidal portions 31 and 32 having convex exterior surface portions 31a and 32a. The toroidal portions 31 and 32 of the elements 30 are separated by an intermediate portion 33 of a reduced radius defining a concave surface portion 33a which is interposed between the convex surfaces 31a and 32a. The elements 30 are provided with axial extensions 34 which are concentric with the portions 31, 32 and 33 thereof. The terminal concentric portions 34 define trunnions about which the elements 30 are rotatable. It will be noted that the extreme ends 34a of the elements 30 are smoothly convex in curvature and, upon rotation of the elements 30, tend to center the elements.

The elements 30 are retained in position so as to be circumferentially grouped about the shoulders 26 and 27 by a housing or carrier indicated generally at 35. The carrier 35 is formed from a pair of generally planar, substantially rectangular plates 36 and 37. The plates 36 and 37 are held in firm assembly with the planar portions thereof in extended intimate surface contact by means of rivets 38 (Figure 2) which traverse abutting portions with the plates. The medial portions of the planar plates 36 and 37 are offset, as at 36a and 37a, to define therebetween a pocket 40 within which the elements 30 are positioned. The offset portions 36a and 37a of the plates 36 and 37 are provided with dimpled or deformed portions 41 and 42, respectively, the dimples being formed to communicate with the pocket 40 and being of a size and shape to rotatably receive the trunnions 34 of the elements 30.

In the illustrated embodiment of the invention, it will be seen that three elements 30 are provided, and the trunnions 34 of two of these tlements 30 are quite snugly received by the corresponding dimples 41 and 42, so that two of the rotatable elements 30 are fixed against both movement axially and radially of the shaft 18, although it will be understood that rotation of the elements 30 is accommodated by the dimples.

The third dimple formed in each of the plates 36 and 37, respectively, is elongate radially of the shaft 18, this elongate dimple being indicated generally at 41a and 42a in Figures 2 and 4. The rotatable element 30 which has its trunnions 34 disposed in these elongate dimples 41a and 42a is movable radially of the shaft 18.

To control the movement of the element 30 in the dimples 41a and 42a, resilient means is provided to urge the one element 30 toward the shaft 18 and the flange 25 thereof. This resilient means is probably best illustrated in Figure 2 of the drawings in which will be seen that the plates 36 and 37 are provided with tangs 43 and 44, respectively, struck from the plane of the respective plates. These tangs 43 and 44 serve to anchor an elongate leaf spring 45 to the carrier 35. The leaf spring 45 is provided adjacent its ends with a recess 46 receiving an adjacent portion of the carrier therein, while the terminal legs 47 of the spring 45 defined by the recess 46 abut the tangs 43 and 44. The bowed leaf spring 45 serves in cooperation with the element 30 disposed in the elongate dimples 41a and 42a to confine therebetween a pressure-distributing saddle or the like 50.

The saddle 50 comprises a bight portion 51 abutted by the central portion of the leaf spring 45 and a pair of inturned legs 52 formed integrally with the bight portion 51 and having semicircular recesses 53 along the terminal edges thereof. The edges of the legs 52 are adapted to abut the trunnions 34 of the one element 30 to urge the element 30 toward the shaft 18 and into engagement with the shoulders 26 and 27 thereon.

The ends of the carrier 35 are supported from the inturned flange 16 of the outer body panel 12 by a pair of depending bolts 54 (Figures 2 and 3). The upper end of each of the bolts 54 is surrounded by a cylindrical spacer 56 which abuts the undersurface of the flange 16 at its upper end, the spacer 56 having its lower end abutting a washer 57 overlying a resilient bushing 58 disposed within registering apertures 59 and 60 formed in the plates 36 and 37, respectively. Each bushing 58 has a reduced central portion extending through the apertures 59 and 60, and radially enlarged shoulders formed integrally with the bushing abut the plates both above and below the apertures. A nut 61 is threaded on the lower end of each of bolts 54 and acts through a washer 62 to draw the bolt, washer, spacer, and the bushing assembly tightly to the flange 16. It will be appreciated that the bushings 58 provide a resilient means for disposing a carrier upon the inner body panel 12.

In the modified form of the invention shown in Figure 5, the elements 30, the carrier 35, and the supporting elements (including the bolts 54 and the bushings 58) are substantially the same as hereinbefore described in connection with the embodiment illustrated in Figures 1–4. However, a different form of shaft 65 is illustrated, the shaft having a pair of circumferential grooves 66 and 67 formed therein, the grooves being arcuately concave in cross section and being of greater radius than the convex surfaces of the toroidal portions 31 of the elements 30. The portions 31 thus abut the shaft 65 on either side of the rib 68 formed by the grooves 66 and 67, the rib defining substantially radial abutment surfaces in point contact with the elements 30.

*Operation*

The operation of the bearing of the present invention will be immediately evident to those skilled in the art upon a study of the description hereinbefore given. However, in order that the advantages of the present invention may be understood fully, a short description of the operation of the bearing of the present invention will be hereinafter given.

The bearing illustrated in the drawings can be readily assembled on the shaft 18 or the shaft 65 by forcing the roller or bearing element 30 mounted in the elongate dimple 41a—42a radially away from the shaft against the biasing force of the spring 45. When the bearing is positioned so that the shaft and bearing elements are in the relationship shown in Figures 3 and 5, the bias of the spring then forces the elements 30 into bearing contact with the shaft.

It will be noted in Figure 3 that the shaft flange or protuberance 25 providing the two substantially radial shoulders 26 and 27 is positioned between the two spaced toroidal portions 31 and 32 of the bearing. The difference in the radii of curvature of the protuberance 25 and of the annular concave portion 33 of the bearing element is such that the shoulders contact only the toroidal portions of the bearing elements, while the concave portion 33 is completely out of contact with the shaft. This resulting point-to-point contact between the shaft and the bearing elements results in improved bearing function without excessive wear or excessive friction between the relatively moving parts. Further, it will be noted that the shoulders 26 and 27 contact the bearing elements 30 radially inwardly from the extreme outer radial portions of the toroidal parts 31 and 32. The overhanging portions of the toroidal portions 31 and 32 resist axial movement of the shaft 18 within the bearing carrier. Thus, the shaft is supported at a plurality of circumferentially spaced points for free rotation, but against axial movement.

Rotation of the shaft 18 is, of course, accommodated by rotation of the individual bearing elements 30 about the longitudinal axes defined by the terminal trunnion portions 34 of the bearing elements. The bearing elements fit snugly within the dimpled portions of the carrier against vertical movement, the two bearing elements 30 illustrated in Figure 3 are also held against radial movement by their engagement with the dimples 41 and 42 of the carrier, while the other bearing element 30 (that which is positioned within the elongated dimple 41a—42a) is radially movable under the influence of the spring 45.

In that embodiment of the invention illustrated in Figure 5, the carrier and the bearing elements are the same as heretofore illustrated, while the shaft 65 is provided with the radial recesses 66 and 67 which define the shoulders engageable with the toroidal portions of the bearing elements to support the shaft 65 against rotation and against axial movement in much the same manner as has been described in connection with the embodiment of Figures 1–4, inclusive. Once again, substantially point-to-point contact is maintained by the different radii of curvature of the recesses 66 and 67 and of the toroidal portions 31, 32 of the bearing elements.

Because of the relative rotational movement between the bearing elements 30 and the shaft 18 or 65, some wear of either the shaft or the bearing element is likely to occur during continuous use of the bearing. If such wear should occur, the spring 45 and the saddle 50 will force the one bearing element 30 radially toward the shaft to take up any slack or dimensional tolerance caused by such wear. The shaft 18 is substantially rigid against deflection from its axial plane and, if substantial wear should occur in either the bearing elements or the shaft, extreme movement of the one bearing element 30 under the influence of the spring 45, may cause alignment between the shaft and the bearing elements.

Such misalignment is prevented by the resilient bushings 58 which form a part of the mounting of the bearing cage on the flange 16. The bushings 58 will distort sufficiently to allow for bodily shifting of the carrier 35 radially of the shaft 18 or 65 without tilting the carrier substantially. Such shifting movement of the carrier 35 will maintain the true running alignment between the bearing elements 30 and the shaft. Also, minor inaccuracies in alignment of the shaft 18 and the flange 16 will be accommodated by the resilient bushings.

One other compensating factor for misalignment is the possibility of actually tilting the one element 30 which is contacted by the spring saddle 50. This saddle may accommodate slight tilting movement of the one bearing element to maintain true bearing alignment.

Thus, it will be seen that the present invention provides a new and novel thrust bearing utilizing a plurality of rotatable bearing elements in substantially point-to-point contact with a rotatable shaft or the like, and the many functional advantages residing in the present invention will be readily appreciated from the foregoing description.

It, will, of course, be understood that various details of construction may be varied through a wide range without departing from the principles of this invention, and it is, therefore, not the purpose to limit the patent granted hereon otherwise than necessitated by the scope of the appended claims.

I claim:

1. In a window regulator or the like of the type having a rotatable threaded shaft engageable with a nut assembly movable therealong to actuate an element thereof, means for journalling the shaft which has a pair of adjacent radial shoulders respectively directed toward opposite ends of the shaft, comprising a plurality of shaft-engaging elements spaced circumferentially about said shoulders, each of said elements being a unitary structure having a pair of toroidal shoulder-engaging surface portions spaced axially of the shaft and respectively engaging said shoulders in substantially point-to-point contact therewith, said toroidal surface portions being connected by an intermediate concave surface portion, and each of said elements having integral trunnions extending outwardly therefrom, said trunnions being concentrically disposed with respect to said surface portions.

2. In a window regulator or the like comprising a rotatable threaded shaft provided with a pair of axially spaced oppositely directed shoulders having sloping but generally radially directed surfaces, a plurality of circumferentially arranged shaft-engaging elements having toroidal surface portions separated by an intermediate portion of smaller radius, the toroidal surface portions being respectively engageable with the generally radially directed surfaces of the shaft shoulders and the intermediate portions of said elements bridging the axial spacing between said shoulders, each of said elements having integral trunnions extending outwardly therefrom, said trunnions being concentrically disposed with respect to said surface portions and a carrier journalling said trunnions of said shaft-engaging elements for rotation about axes generally parallel to the axis of the shaft and coincident with the axis of generation of said toroidal surface portions.

3. In a bearing for journalling a rotatable shaft provided with a pair of axially spaced oppositely directed shoulders having appreciable radially directed surfaces, a plurality of circumferentially arranged shaft-engaging elements having toroidal surface portions separated by an intermediate portion of smaller radius, the toroidal surface portions being respectively embracingly engageable with the generally radially directed surfaces of the shaft shoulders and the intermediate portions of said elements bridging the shoulders, and a carrier journalling said shaft-engaging elements for rotation about axes generally parallel to the axis of the shaft and coincident with the axis of generation of the respective toroidal surface portions.

4. A double thrust bearing comprising a bearing cage having means defining a plurality of opposed circumferentially spaced sockets, a plurality of substantially identical bearing elements having terminal portions seated in said sockets and radially enlarged thrust surfaces therebetween, said thrust surfaces being axially spaced and toroidal in contour for engagement with circumferentially similarly spaced substantially radial thrust faces formed on a member to be journalled by the bearing and projecting into contact with said elements to be embraced thereby.

5. A thrust-bearing assembly including a shaft having a radially extending projection provided with arcuately shaped outer surfaces terminating at the periphery thereof, said surfaces being directed toward opposite ends of the shaft, and bearing means to receive the shaft for rotation comprising a plurality of rotatable bearing elements mounted peripherally about the shaft and having radially enlarged contacting surfaces, said surfaces being convexly curved and straddling the projection to engage the arcuately shaped portions and limit relative axial movement between the shaft and bearing elements, said outer portions and said contacting surfaces having different radii of curvature to provide substantially a point-to-point contact therebetween and permit the contacting surfaces to extend appreciably inwardly past the periphery of the projection toward the shaft.

6. A thrust-bearing assembly as claimed in claim 5 wherein said bearing means further comprises a housing including plate members having oppositely offset portions to define a pocket for rotatably mounting therein the bearing elements, and spring means supported by the housing for operatively engaging a rotatable element and urging it toward the shaft, said spring means being adapted to permit a tilting movement of the bearing element so engaged to maintain a desired bearing alignment in the assembly.

7. A thrust-bearing assembly including a shaft having a radially extending projection provided with arcuately shaped outer portions which are directed toward opposite ends of the shaft, and bearing means to receive the shaft for rotation comprising a plurality of unitary rotatable bearing elements mounted peripherally about the shaft and having radially enlarged toroidal portions separated axially along each element by an intermediate portion of reduced diameter, said toroidal portions of each bearing element bridging the radially extending portion to embracingly engage the outer portions thereof and prevent axial movement of the shaft, said outer portions and said toroidal portions having different radii of curvature to provide substantially a point-to-point contact therebetween and permit the toroidal portions to extend appreciably past the end of the projection toward the shaft while maintaining the intermediate portion of each element and the projection out of contact.

8. A thrust-bearing assembly including a shaft having an integral radial projection terminating in arcuately shaped shoulder portions which are directed toward opposite ends of the shaft, and bearing means for rotatably mounting the shaft comprising a housing fixed against axial movement and including opposed plate members having oppositely offset portions to define a pocket, elongate bearing elements in the pocket having their ends pivotally journaled in the opposing plate members, said elements having radially enlarged toroidal contacting surfaces spaced axially of each element by an intermediate portion of reduced diameter, said toroidal surfaces straddling the projection to embracingly engage the arcuately shaped portions thereof and receive axial thrust of the shaft in either direction thereby to hold the shaft against axial movement, the radius of curvature of the shoulder portions being larger than the radius of curvature of the toroidal surfaces to enable the latter to extend appreciably past an end of the projection to effect the embracing engagement between the bearing elements and the projection whereby axial thrust loads in either direction are distributed over a substantial area of the projection and bearing element.

9. A thrust-bearing assembly including a shaft having circumferential grooves of arcuate cross section defining an intermediate rib member terminating in an outer periphery, bearing means for rotatably mounting the shaft comprising a housing extending about the shaft, elongated bearing elements carried by the housing for rotation substantially about their longitudinal axes and having a pair of radially enlarged contacting surfaces, said surfaces being convexly curved and stationed on opposite sides of the rib member to engage the arcuate sides thereof and receive axial thrust of the shaft, said grooves and said contacting surfaces having different radii of curvature to permit the contacting surfaces to embracingly engage and extend substantially past said periphery of the rib member toward the shaft.

10. A thrust-bearing assembly including a shaft having circumferential grooves substantially uniformly spaced apart axially of the shaft, said grooves having a concave curvature and defining an intermediate rib member terminating in an outer periphery, and bearing means for rotatably mounting the shaft comprising a housing fixed against axial movement and including opposed plate members having oppositely offset portions to define a pocket, elongate bearing elements in the pocket having their ends pivotally journaled in the opposing plate members, said elements having radially enlarged toroidal contacting surfaces spaced axially of each element by an intermediate portion of reduced diameter, said toroidal surfaces straddling the rib member to embracingly engage the concave sides thereof and receive axial thrust of the shaft in either direction thereby to hold the shaft against axial movement, the radius of curvature of the toroidal surfaces being less than the radius of curvature of the grooves and said surfaces being spaced apart a distance to enable the toroidal surfaces to extend appreciably past said periphery of the rib member whereby to position the bearing elements more readily to withstand axial thrust.

References Cited in the file of this patent

UNITED STATES PATENTS

| | | |
|---|---|---|
| 452,373 | Hardy | May 19, 1891 |
| 1,827,968 | Le Bryant | Oct. 20, 1931 |
| 2,266,888 | McCurdy et al. | Dec. 23, 1941 |
| 2,714,005 | Wise | July 26, 1955 |
| 2,731,261 | Drum | Jan. 17, 1956 |

UNITED STATES PATENT OFFICE
CERTIFICATE OF CORRECTION

Patent No. 2,914,366                                        November 24, 1959

John W. Anderson

It is hereby certified that error appears in the printed specification of the above numbered patent requiring correction and that the said Letters Patent should read as corrected below.

Column 4, line 58, for "portions" read -- portion --; line 72, for "elongated" read -- elongate --; column 5, line 22, for "alignment" read -- misalignment --.

Signed and sealed this 2nd day of August 1960.

(SEAL)

Attest:

KARL H. AXLINE                                              ROBERT C. WATSON

Attesting Officer                                        Commissioner of Patents